(12) United States Patent
Iwao et al.

(10) Patent No.: US 10,300,837 B2
(45) Date of Patent: May 28, 2019

(54) FRONT STRUCTURE OF VEHICLE HAVING VENTILATION PATH TO COOL VEHICLE LAMP

(71) Applicant: MAZDA MOTOR CORPORATION, Hiroshima (JP)

(72) Inventors: Norihito Iwao, Hiroshima (JP); Yasuaki Kikuchi, Hiroshima (JP); Qian Zhao, Beijing (CN); Yusuke Nakamura, Hiroshima (JP); Takahiro Matsui, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 110 days.

(21) Appl. No.: 15/513,890

(22) PCT Filed: Sep. 21, 2016

(86) PCT No.: PCT/JP2016/077875
§ 371 (c)(1),
(2) Date: Mar. 23, 2017

(87) PCT Pub. No.: WO2017/073208
PCT Pub. Date: May 4, 2017

(65) Prior Publication Data
US 2017/0297476 A1    Oct. 19, 2017

(30) Foreign Application Priority Data
Oct. 26, 2015    (JP) .................................. 2015-209760

(51) Int. Cl.
*B60Q 1/068*    (2006.01)
*F21S 41/143*    (2018.01)
(Continued)

(52) U.S. Cl.
CPC ........... *B60Q 1/068* (2013.01); *B60Q 1/0094* (2013.01); *B60Q 1/04* (2013.01); *B60Q 1/08* (2013.01);
(Continued)

(58) Field of Classification Search
CPC ........ F21S 41/143; F21S 41/192; F21S 41/24; F21S 45/47; F21S 45/48; F21S 41/28;
(Continued)

(56) References Cited

U.S. PATENT DOCUMENTS

2010/0202153 A1*  8/2010  Schwab ............... B60Q 1/0041
                                                    362/520
2014/0140082 A1    5/2014  Kuboyama et al.

FOREIGN PATENT DOCUMENTS

JP    2005-122945 A    5/2005
JP    2013-033938 A    2/2013
JP    2015-112954 A    6/2015

OTHER PUBLICATIONS

Machine translation of JP 2005 122945 A, retrieved Aug. 29, 2018.*
(Continued)

*Primary Examiner* — Bao Q Truong
*Assistant Examiner* — Steven Y Horikoshi
(74) *Attorney, Agent, or Firm* — Studebaker & Brackett PC (57) ABSTRACT

A front structure of a vehicle is provided with a vehicle front lamp disposed at each end portion of a vehicle front portion in a vehicle width direction. The vehicle front lamp includes a headlight, a cover member, and a lighting accessory. The cover member is disposed above the headlight. The lighting accessory is disposed above a rear portion of the headlight and below the cover member. The vehicle front lamp is provided with a ventilation path that is formed outward or inward of the headlight in the vehicle width direction below (Continued)

the cover member and that allows traveling wind from a vehicle front side to pass toward a vehicle rear side.

6 Claims, 11 Drawing Sheets

(51) Int. Cl.

| | |
|---|---|
| *B60Q 1/00* | (2006.01) |
| *B60Q 1/04* | (2006.01) |
| *F21V 29/74* | (2015.01) |
| *F21V 29/83* | (2015.01) |
| *F21S 41/20* | (2018.01) |
| *F21S 41/141* | (2018.01) |
| *F21S 41/657* | (2018.01) |
| *F21S 45/47* | (2018.01) |
| *F21S 41/32* | (2018.01) |
| *B60Q 1/08* | (2006.01) |
| *F21S 41/19* | (2018.01) |
| *F21S 41/255* | (2018.01) |
| *F21S 43/14* | (2018.01) |
| *F21S 43/15* | (2018.01) |
| *F21S 43/31* | (2018.01) |
| *F21S 45/49* | (2018.01) |
| *F21S 41/153* | (2018.01) |
| *F21Y 115/10* | (2016.01) |
| *B62D 35/00* | (2006.01) |
| *F21W 102/19* | (2018.01) |
| *F21W 103/15* | (2018.01) |

(52) U.S. Cl.
CPC ........... *F21S 41/141* (2018.01); *F21S 41/143* (2018.01); *F21S 41/153* (2018.01); *F21S 41/19* (2018.01); *F21S 41/255* (2018.01); *F21S 41/28* (2018.01); *F21S 41/32* (2018.01); *F21S 41/657* (2018.01); *F21S 43/14* (2018.01); *F21S 43/15* (2018.01); *F21S 43/31* (2018.01); *F21S 45/47* (2018.01); *F21S 45/49* (2018.01); *F21V 29/74* (2015.01); *F21V 29/83* (2015.01); *B62D 35/00* (2013.01); *F21W 2102/19* (2018.01); *F21W 2103/15* (2018.01); *F21Y 2115/10* (2016.08)

(58) Field of Classification Search
CPC ...... F21S 41/285; B60Q 1/0094; F21V 29/20; F21V 29/2212
See application file for complete search history.

(56) References Cited

OTHER PUBLICATIONS

International Search Report issued in PCT/JP2016/077875; dated Dec. 6, 2016.

\* cited by examiner

FRONT STRUCTURE OF VEHICLE HAVING
VENTILATION PATH TO COOL VEHICLE
LAMP

TECHNICAL FIELD

The present disclosure relates to a front structure of a vehicle having a vehicle front lamp is provided at each end portion of a vehicle front portion in a vehicle width direction.

BACKGROUND ART

In general, when a heavy object is present in the front of a front axle of a vehicle, the yaw moment of inertia acts in steering. For this reason, a shorter front overhang has been demanded. In particular, such a front overhang has been strongly demanded for, e.g., a sports car requiring a high vehicle motion performance.

In order to shorten a front overhang, the front-to-rear length of a head lamp unit may be shortened.

However, in a recent head lamp unit, associated structures such as an active front lighting system (AFS) drive device and an LED heat sink for cooling LEDs used as a light source are provided, and tendency shows that the size of the head lamp unit increases.

Note that the AFS drive device is a drive device configured to change a irradiation direction of a head lamp according to a vehicle traveling state.

In the case of providing an additional lamp such as an accessory, the size of the head lamp unit further increases. Thus, it is difficult to shorten the front-to-rear length of the head lamp unit.

When the front overhang is shortened for ensuring the vehicle motion performance (reducing the yaw moment of inertia) and ensuring design properties (fine appearance), there are concerns about contact with the periphery of the head lamp unit and lowering of cooling performance Patent Literature 1 discloses a head lamp unit configured such that an accessory lamp and an AFS drive device are embedded in an LED head lamp. However, in a typical structure disclosed in Patent Literature 1, an LED heat sink including heat dissipation fins and the AFS drive device are arranged in a vehicle width direction or a vehicle lower direction. For this reason, the front-to-rear length of a vehicle front lamp (a head lamp unit) cannot be sufficiently shortened, and further improvement needs to be made for dealing with overhang shortening.

CITATION LIST

Patent Literature

Patent Literature 1: Japanese Unexamined Patent Publication No. 2015-112954

SUMMARY OF INVENTION

The present disclosure has been made in view of the problems described above, and is intended to provide a front structure of a vehicle configured so that both of shortening of the front-to-rear length of a vehicle front lamp and ensuring of cooling performance can be realized, and therefore, improvement of the degree of freedom in a vehicle layout and shortening of a front overhang can be realized.

A front structure of a vehicle according to an aspect of the present disclosure is configured such that a vehicle front lamp is provided at each end portion of a vehicle front portion in a vehicle width direction. The vehicle front lamp includes a headlight, a cover member, and a lighting accessory.

The cover member is disposed above the headlight.

The lighting accessory is disposed above a rear portion of the headlight and below the cover member.

Moreover, the vehicle front lamp of the present aspect is provided with a ventilation path formed outward or inward of the headlight in the vehicle width direction below the cover member and allowing traveling wind from a vehicle front side to pass toward a vehicle rear side.

DESCRIPTION OF EMBODIMENTS

An embodiment of the present disclosure will be described below with reference to drawings. Note that the embodiment described below is an aspect of the present disclosure, and the present disclosure is, except for an essential configuration thereof, not limited to the embodiment described below.

1. Outline Structure of Vehicle 100

First, an outline structure of a vehicle 100 of the present embodiment will be described with reference to FIGS. 1 and 2.

Figure 1:
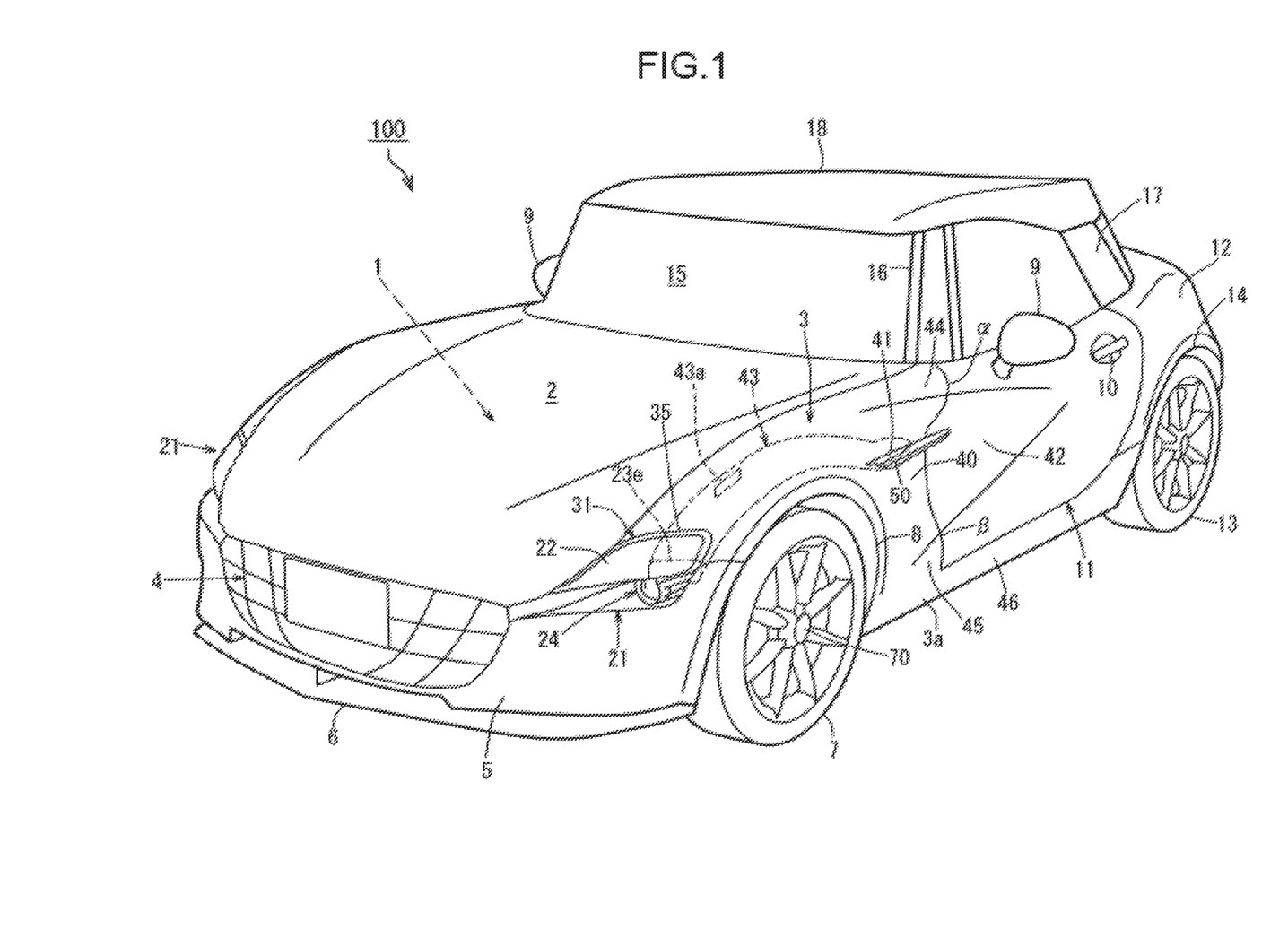
FIG. 1 is a schematic perspective view of a configuration of a vehicle 100 of an embodiment from a front left side.
Figure 2:
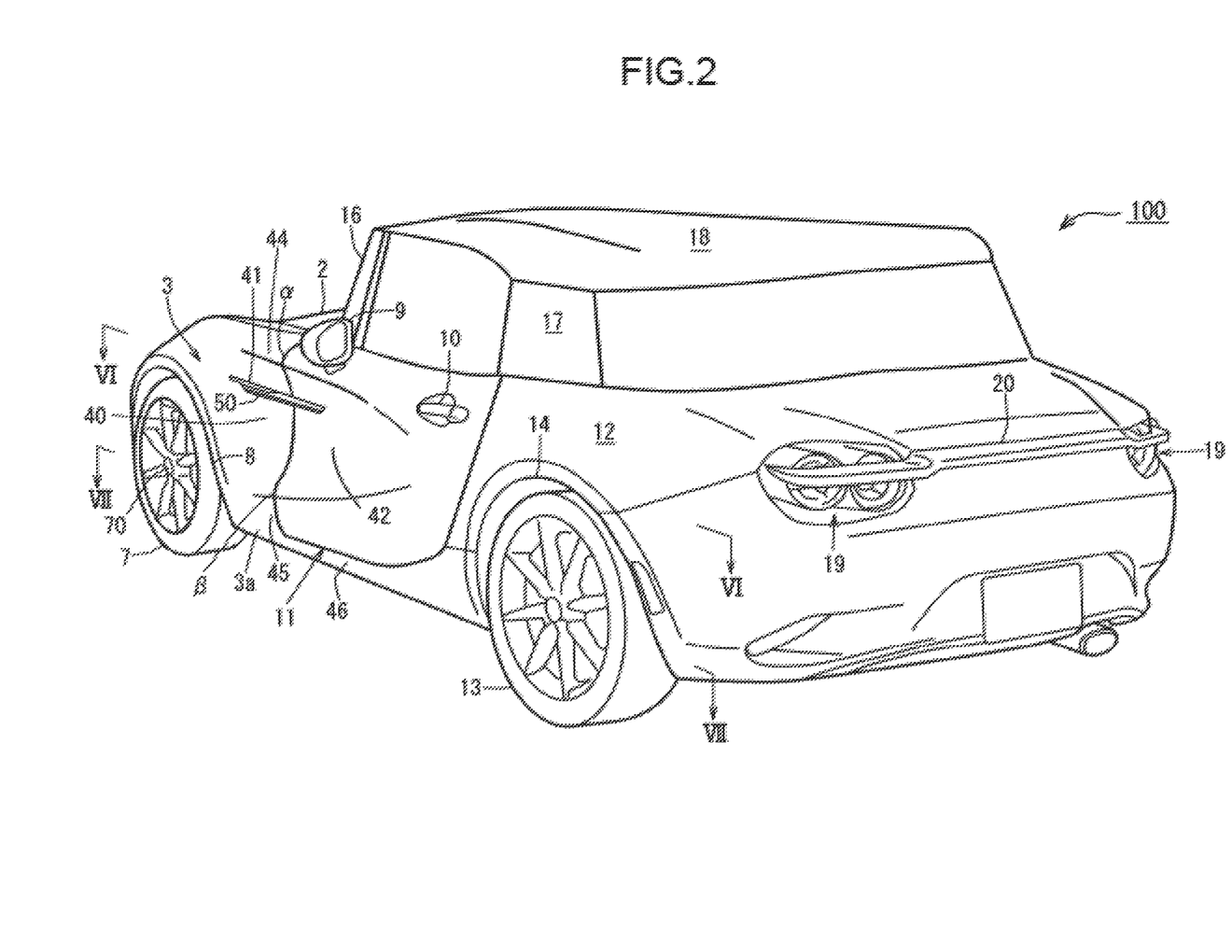
FIG. 2 is a schematic perspective view of the configuration of the vehicle 100 from a rear left side.

FIG. 1 is a schematic perspective view of a configuration of the vehicle 100 from a front left side, and FIG. 2 is a schematic perspective view of the configuration of the vehicle 100 from a rear left side.

Prior to description of a front structure of the vehicle 100, a vehicle structure will be first schematically described with reference to FIGS. 1 and 2.

As illustrated in FIG. 1, an engine room 1 positioned at a front portion of the vehicle 100 is, on an upper side thereof, covered with a hood 2. Both of right and left sides of the engine room 1 are covered respectively with front fenders (specifically, front fender panels) 3. A front portion of the engine room 1 is covered with a front bumper face 5 including a front grille 4.

A lower stiffener 6 is provided below the front bumper face 5. The lower stiffener 6 is a so-called leg sweeping member, and is a member for preventing secondary collision in such a manner that a pedestrian is, upon collision with the lower stiffener 6, tilted over the hood 2 by sweeping of the legs of the pedestrian.

Each front fender 3 includes a wheel arch portion 8 corresponding to a front wheel 7.

A side door 11 is provided on a rear side of each of the right and left front fenders 3. The side door 11 is provided with a door mirror 9 and a door outer handle 10.

A rear fender 12 is provided on a rear side of each side door 11. Each rear fender 12 includes a wheel arch portion 14 corresponding to a rear wheel 13.

As illustrated in FIG. 1, front window glass 15 is provided at a rear end of the engine room 1, and front pillars 16 are provided respectively on both sides of the front window glass 15 in a vehicle width direction. Moreover, as illustrated in FIG. 2, a rear pillar 17 is provided on a rear side of a window of each side door 11, and an upper portion of a vehicle compartment is covered with a roof portion 18. Further, at a rear portion of the vehicle 100, tail lamps 19 are provided respectively at both end portions in the vehicle width direction, and a rear spoiler 20 is provided.

2. Front Structure of Vehicle 100

Next, the front structure of the vehicle 100 will be described with reference not only to FIGS. 1 and 2, but also to FIGS. 3 to 5.

Figure 3:
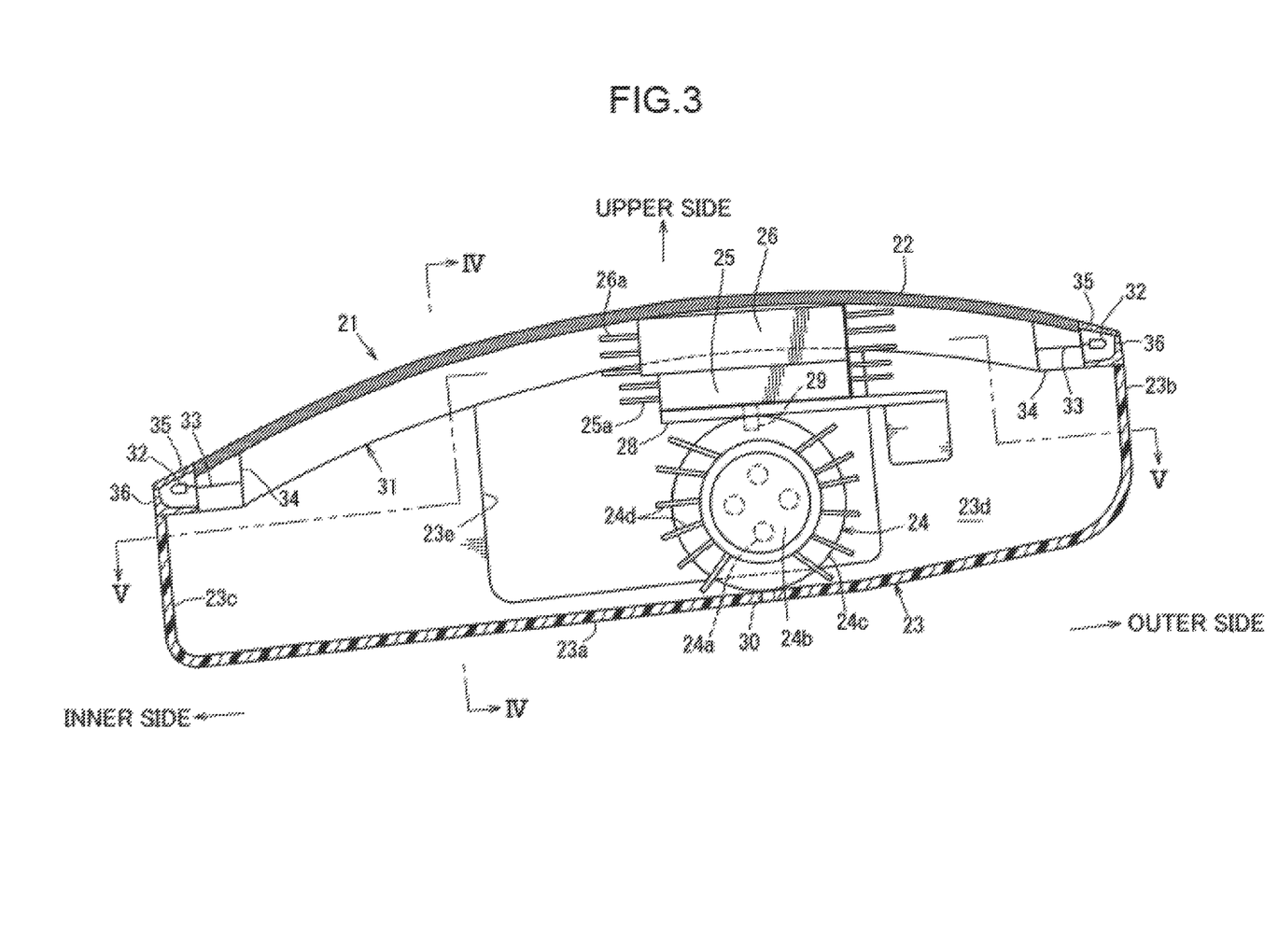
FIG. 3 is a schematic cross-sectional view of a configuration of a head lamp unit 21 in the vehicle 100.
Figure 4:
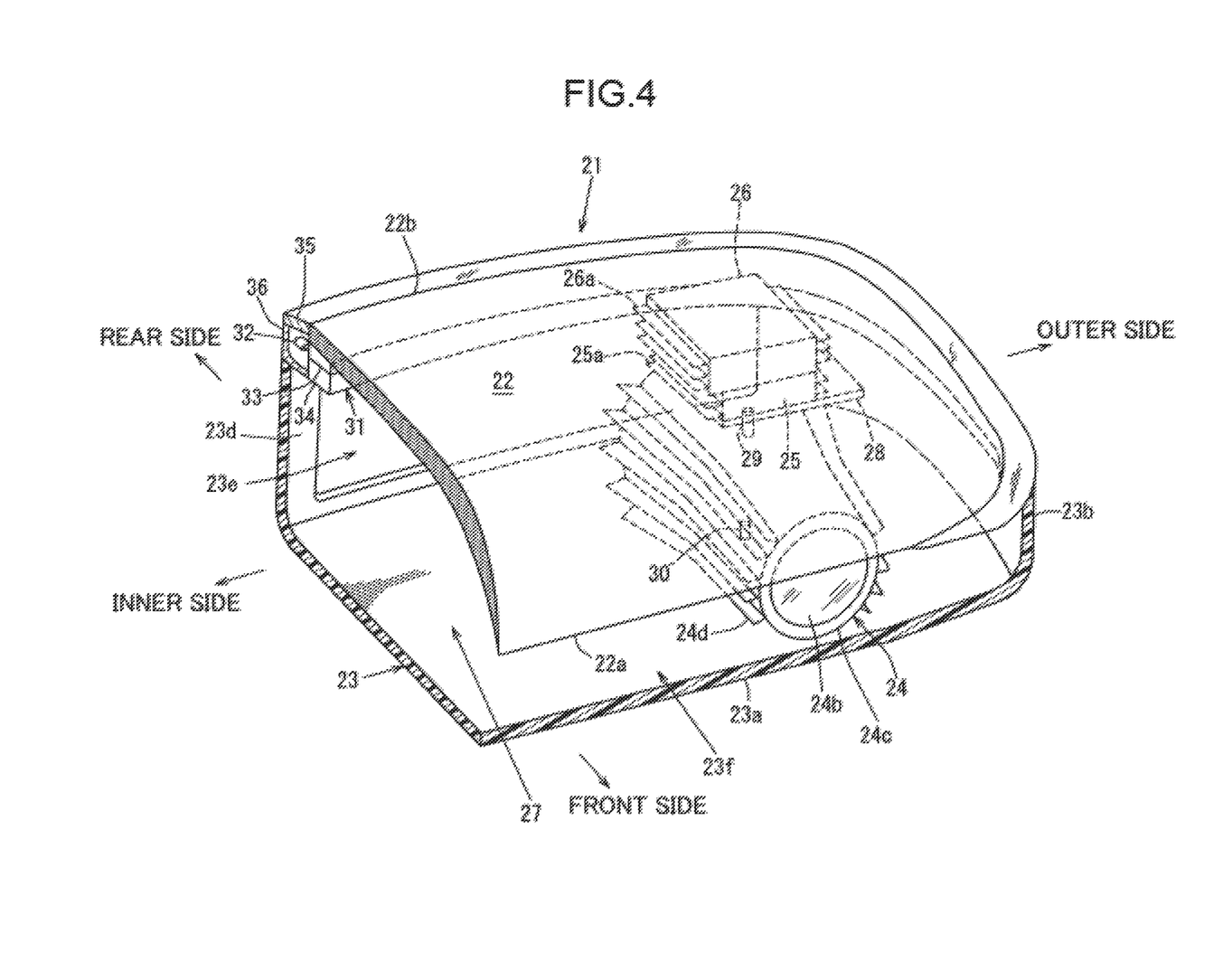
FIG. 4 is a schematic perspective view of the configuration of the head lamp unit 21 with a cross section along an IV-IV line of FIG. 3.
Figure 5:
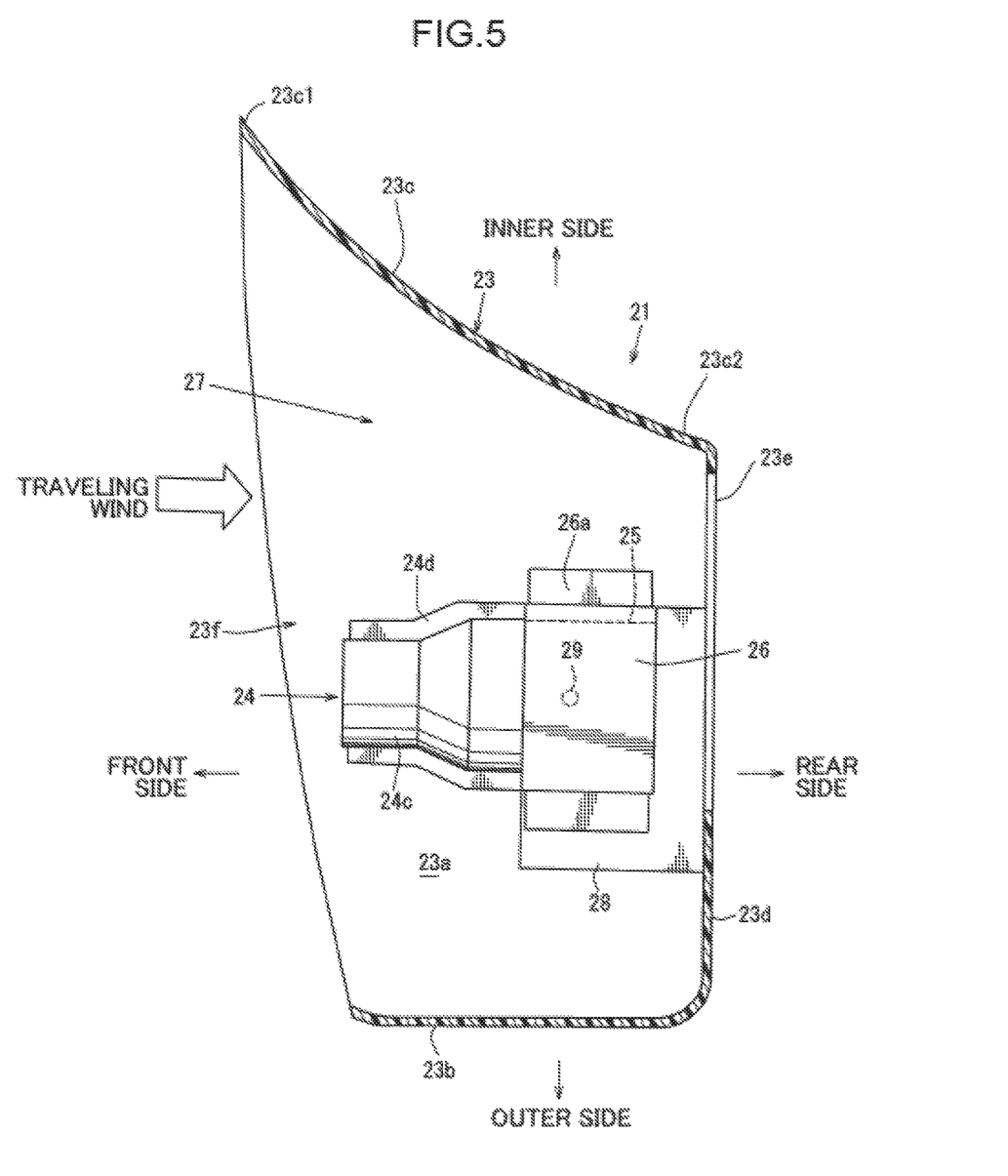
FIG. 5 is a schematic cross-sectional view of a partial configuration of the head lamp unit 21 with a cross section along a V-V line of FIG. 3.

FIG. 3 is a schematic cross-sectional view of a configuration of a head lamp unit (a vehicle front lamp) in the vehicle 100, FIG. 4 is a schematic perspective view of a configuration of a head lamp unit 21 with a cross section along an IV-IV line of FIG. 3, and FIG. 5 is a schematic cross-sectional view of a partial configuration of the head lamp unit 21 with a cross section along a V-V line of FIG. 3.

As illustrated in FIG. 1, the head lamp unit 21 as the vehicle front lamp is provided at each end portion of the vehicle front portion in the vehicle width direction, specifically between a front end portion of each front fender 3 and an upper rear end portion of the front bumper face 5 in the vehicle width direction.

As illustrated in FIGS. 3 to 5, each head lamp unit 21 includes, in an internal space formed by a cover member 22 positioned on the upper side and a head lamp unit case 23 positioned on a lower side, a head lamp 24 as a headlight, an AFS actuator 25, and a controller 26.

The cover member 22 disposed above the head lamp 24 forms a design surface designed continuously from the front end portion of the front fender 3. As illustrated in FIGS. 1 and 4, the cover member 22 is formed such that a front end 22a of the cover member 22 is positioned on a lower front side of a rear end 22b of the cover member 22.

The head lamp unit case 23 is made of synthetic resin. The head lamp unit case 23 includes a bottom wall 23a, side walls 23b, 23c standing upward respectively from both sides of the bottom wall 23a in the vehicle width direction, and a rear wall 23d standing upward from a rear end of the bottom wall 23a. The bottom wall 23a, the side walls 23b, 23c, and the rear wall 23d are continuous to each other. The rear wall 23d is provided with a rear opening 23e as an opening including the arrangement position of the head lamp 24 as viewed from front.

As illustrated in FIG. 5, the side wall 23c on an inner side in the vehicle width direction is formed such that a front end 23c1 thereof is positioned on the inner side of a rear end 23c2 of the side wall 23c in the vehicle width direction. In other words, the side wall 23c is defined by a smooth curved surface gradually extending toward an outer side in the vehicle width direction from the front end 23c1 to the rear end 23c2.

A front opening 23f as an opening surrounded by a front end of the head lamp unit case 23 and the front end 22a of the cover member 22 is formed at a front end of the head lamp unit 21. The length of the front opening 23f in the vehicle width direction is formed much longer than the length of the later-described rear opening 23e in the vehicle width direction.

As illustrated in FIGS. 4 and 5, a ventilation path 27 allowing communication between the front opening 23f and the rear opening 23e in a vehicle front-to-rear direction so that traveling wind from a vehicle front side can pass toward a vehicle rear side is formed inward of the head lamp 24 in the vehicle width direction below the cover member 22. Note that the ventilation path 27 may be formed outward of the head lamp 24 in the vehicle width direction.

As illustrated in FIG. 3, the head lamp 24 includes a plurality of LEDs 24a as a light source, an outer lens 24b, and a lamp housing 24c. Heat dissipation fins 24d as an air-cooling unit extending in the vehicle front-to-rear direction and at least partially disposed in the ventilation path 27 are provided at an outer peripheral portion of the lamp housing 24c.

The active front lighting system actuator (the AFS actuator) 25 is attached to a support member 28 fixed to the rear wall 23d of the head lamp unit case 23, and is disposed at a position above a rear portion of the head lamp 24. The AFS actuator 25 is configured to change an irradiation direction of the head lamp 24 according to a vehicle traveling state.

In this state, a rotary output shaft 29 of the AFS actuator 25 is fitted into an upper portion of the lamp housing 24c through the support member 28. It is configured such that a rotary center shaft 30 is, below the lamp housing 24c, provided coincident with a shaft center line of the rotary output shaft 29 and that the irradiation direction of the head lamp 24 is changed about the rotary output shaft 29 and the rotary center shaft 30.

The rotary center shaft 30 is rotatably supported on the bottom wall 23a of the head lamp unit case 23.

The controller 26 is configured to control lighting circuits of the head lamp 24 and a later-described illumination lamp unit 31 and the AFS actuator 25. The controller 26 is provided above the AFS actuator 25, and is disposed at a position above the rear portion of the head lamp 24.

The AFS actuator 25 and the controller 26 are lighting accessories, and the lighting accessories are arranged above the rear portion of the head lamp 24.

In other words, the cover member 22 is disposed above the head lamp 24, the ventilation path 27 allowing passage of traveling wind from the vehicle front side is formed inward of the head lamp 24 in the vehicle width direction below the cover member 22, and the AFS actuator 25 and the controller 26 as the lighting accessories are arranged above the rear portion of the head lamp 24.

With the configuration in which the lighting accessories are arranged above the rear portion of the head lamp 24, the front-to-rear length of the head lamp unit 21 is shortened.

Moreover, the ventilation path 27 allowing passage of traveling wind is formed inward of the head lamp 24 in the vehicle width direction below the cover member 22, and therefore, it is configured such that the head lamp 24 and the lighting accessories are cooled with the traveling wind passing through the ventilation path 27.

That is, it is configured such that both of shortening of the front-to-rear length of the head lamp unit 21 and ensuring of cooling performance are realized, and as a result, improvement of the degree of freedom in a vehicle layout and shortening of a front overhang are realized.

Particularly in the present embodiment, the ventilation path 27 is formed to allow communication between the front opening 23f with a long length in the vehicle width direction and a great amount of traveling air to be taken and the rear opening 23e with a short length in the vehicle width direction, and therefore, traveling air flowing into the ventilation path 27 through the front opening 23f converges as the traveling air flows toward a rear side of the ventilation path 27. Such action can further improve the cooling performance.

The AFS actuator 25 and the controller 26 as the lighting accessories and the head lamp 24 as the headlight are each provided with a plurality of heat dissipation fins 25a, 26a, 24d as an air-cooling unit.

Each of these heat dissipation fins 25a, 26a, 24d extends in the vehicle front-to-rear direction, and is at least partially disposed in the ventilation path 27. With this configuration, it is configured such that the temperature of each LED 24a of the head lamp 24, the temperature of the AFS actuator 25, and the temperature of the controller 26 are effectively decreased by air cooling.

Note that in the present embodiment, the heat dissipation fins 25a, 26a, 24d are provided at all of the AFS actuator 25, the controller 26, and the head lamp 24, but are not necessarily provided at all of these components. The heat dissipation fins may be selectively provided.

As illustrated in FIG. 1 and FIGS. 3 to 4, the illumination lamp unit 31 is provided at the periphery of the cover member 22, specifically from the periphery of the cover member 22 on the inner side in the vehicle width direction to the periphery of the cover member 22 on the outer side in the vehicle width direction through the periphery of the cover member 22 on a rear side in the vehicle front-to-rear direction.

The illumination lamp unit 31 includes a plurality of LEDs 32 as a light emitter, a printed circuit board 33, a housing 34, a lens 35, and a reflector 36. The plurality of LEDs 32 are arranged at optional intervals or equal intervals at the outer periphery of the cover member 22, specifically in an area extending from the outer periphery of the cover member 22 on the inner side in the vehicle width direction to the outer periphery of the cover member 22 on the outer side in the vehicle width direction through the outer periphery of the cover member 22 on the rear side in the vehicle front-to-rear direction. The printed circuit board 33 is a substrate disposed below the peripheral edge of the cover member 22 to electrically connect the LEDs 32. The housing 34 surrounds the printed circuit board 33. The lens 35 is positioned above the plurality of LEDs 32, and is disposed flush with an upper surface of the peripheral edge of the cover member 22. The reflector 36 has a substantially L-shaped cross section, and is positioned at the outer periphery of the plurality of LEDs 32 below the plurality of LEDs 32.

In other words, the plurality of LEDs 32 are arranged at the outer periphery of the cover member 22, and the printed circuit board 33 and the housing 34 as accessories of the LEDs 32 are arranged below the cover member 22. With this configuration, the printed circuit board 33 and the housing 34 are compactly arranged below the cover member 22, and therefore, design is improved while layout properties are ensured.

Note that in the vehicle 100 of the present embodiment, the illumination lamp unit 31 can be used as a clearance lamp.

Further, the head lamp 24 is, through the rotary center shaft 30, supported on the bottom wall 23a of the head lamp unit case 23. Moreover, the controller 26 and the AFS actuator 25 as the lighting accessories are, through the support member 28, supported on the rear wall 23d of the head lamp unit case 23. The cover member 22 is supported on the housing 34. The printed circuit board 33 and the housing 34 as the accessories of the light emitter (see the LEDs 32) are, through the reflector 36, supported on the head lamp unit case 23.

That is, the head lamp 24, the cover member 22, the controller 26, the AFS actuator 25, the printed circuit board 33, and the housing 34 are integrally assembled together. With this configuration, both of mountability of the head lamp unit 21 on the vehicle and the accuracy of assembly among the components are ensured.

3. Side Structure of Vehicle 100

Next, a side structure of the vehicle will be described with reference not only to FIGS. 1 and 2, but also to FIGS. 6 to 11.

Figure 6:
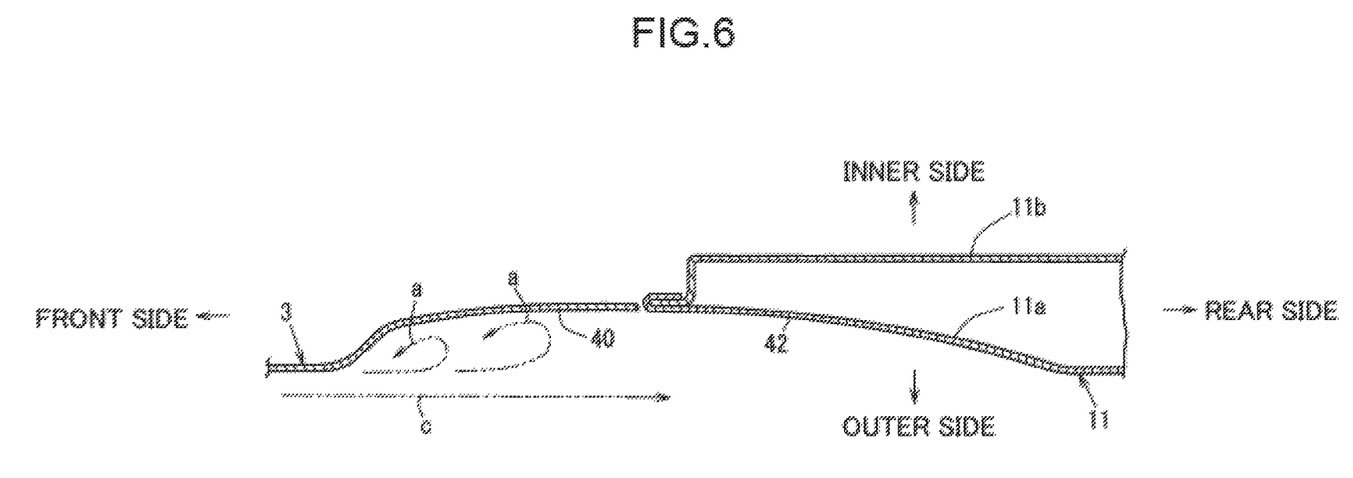
FIG. 6 is a schematic cross-sectional view of partial configurations of a front fender 3 and a side door 11 in the vehicle 100 with a cross section along a VI-VI line of FIG. 2.
Figure 7:
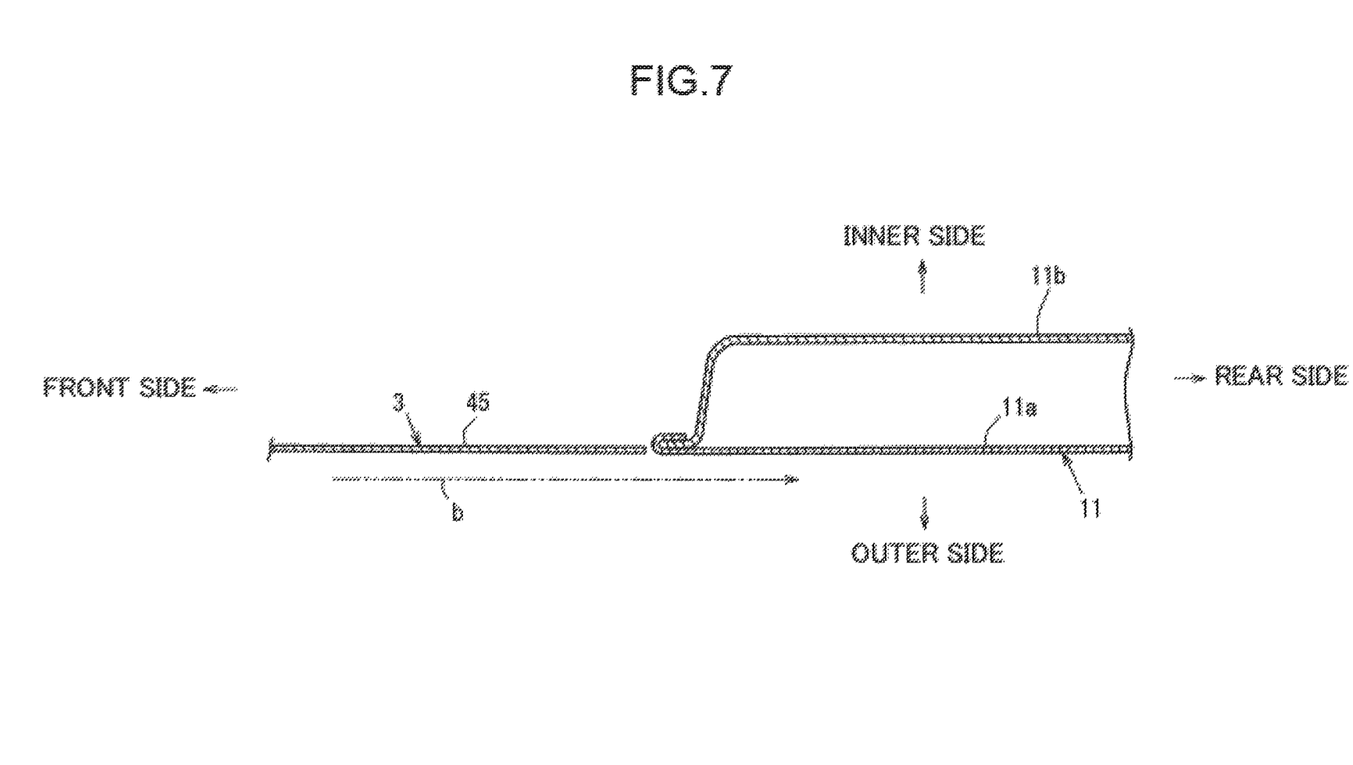
FIG. 7 is a schematic cross-sectional view of the partial configurations of the front fender 3 and the side door 11 in the vehicle 100 with a cross section along a VII-VII line of FIG. 2.
Figure 8:
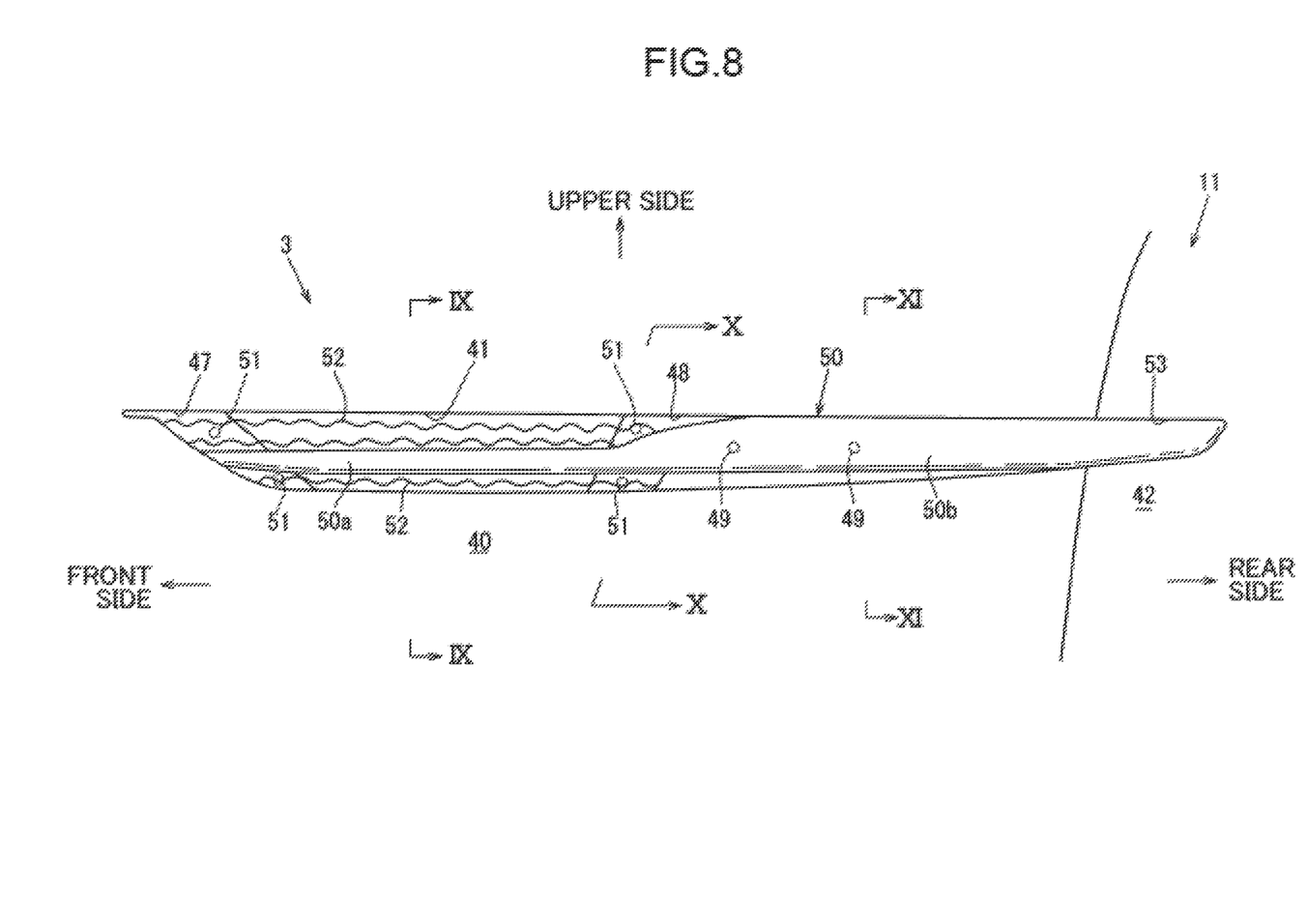
FIG. 8 is a schematic side view of a configuration of a protruding member 50 attached to the front fender 3.
Figure 9:
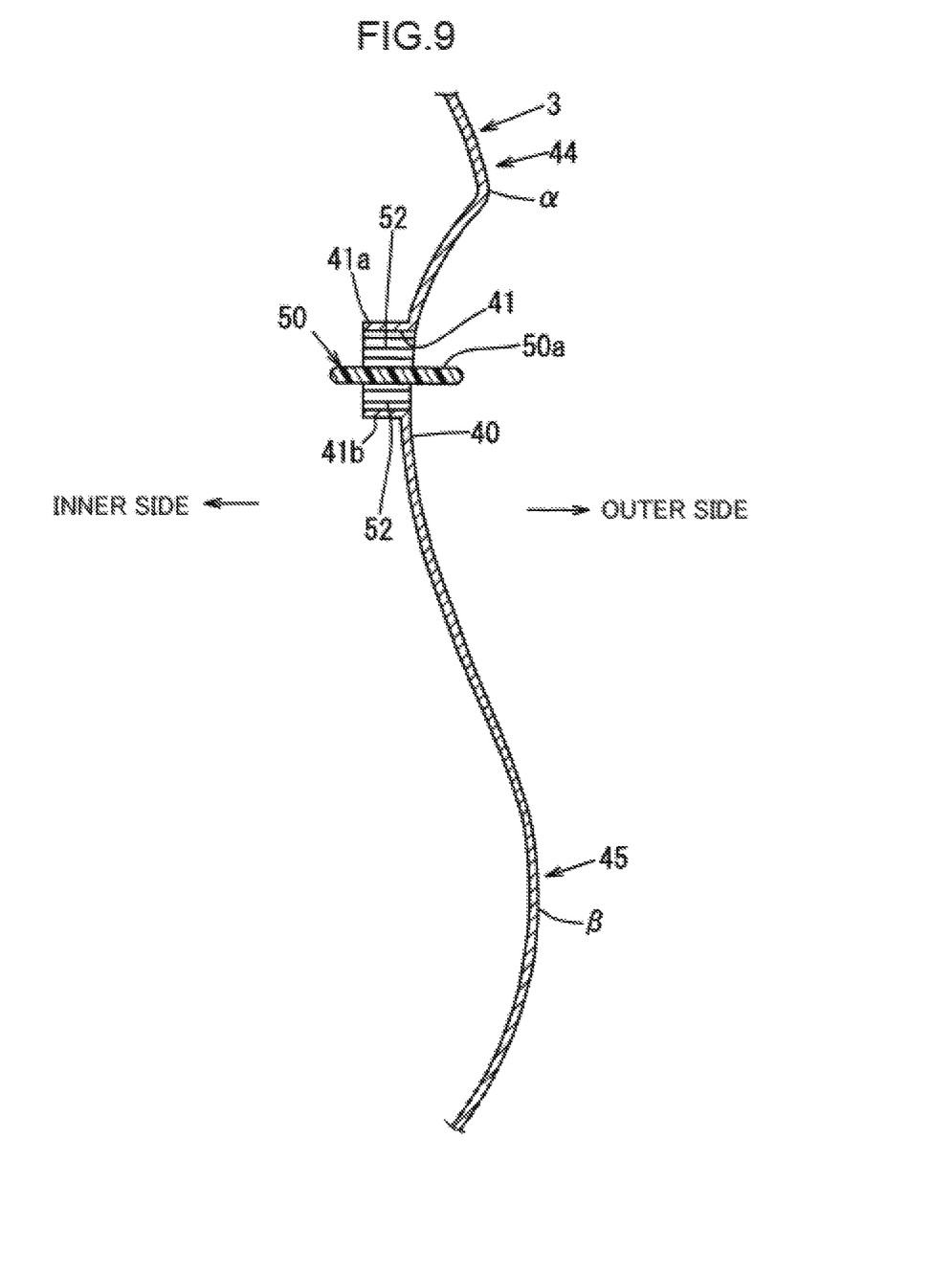
FIG. 9 is a schematic cross-sectional view of a recessed portion 40 and a peripheral configuration in the front fender 3 with a cross section along an IX-IX line of FIG. 8.
Figure 10:
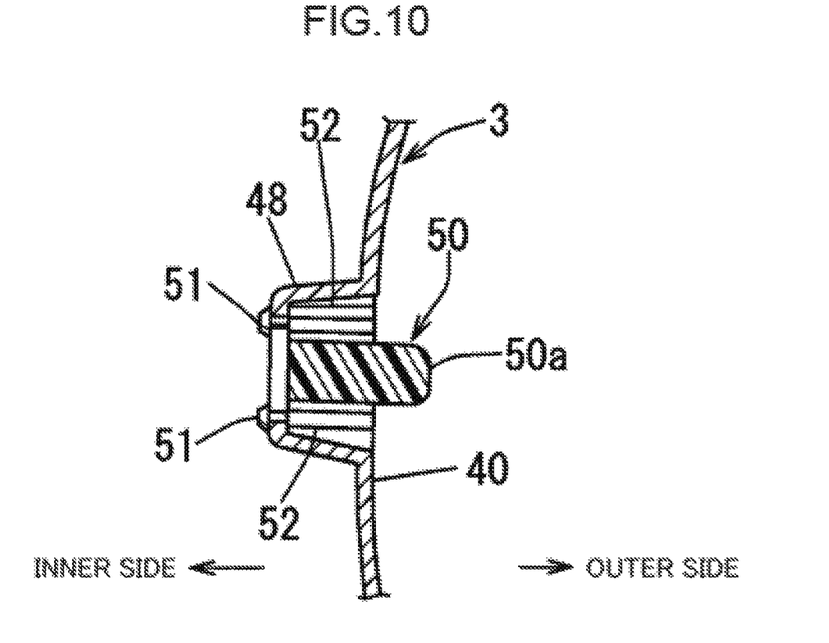
FIG. 10 is a schematic cross-sectional view of an attachment structure of the protruding member 50 to the front fender 3 with a cross section along a X-X line of FIG. 8.
Figure 11:
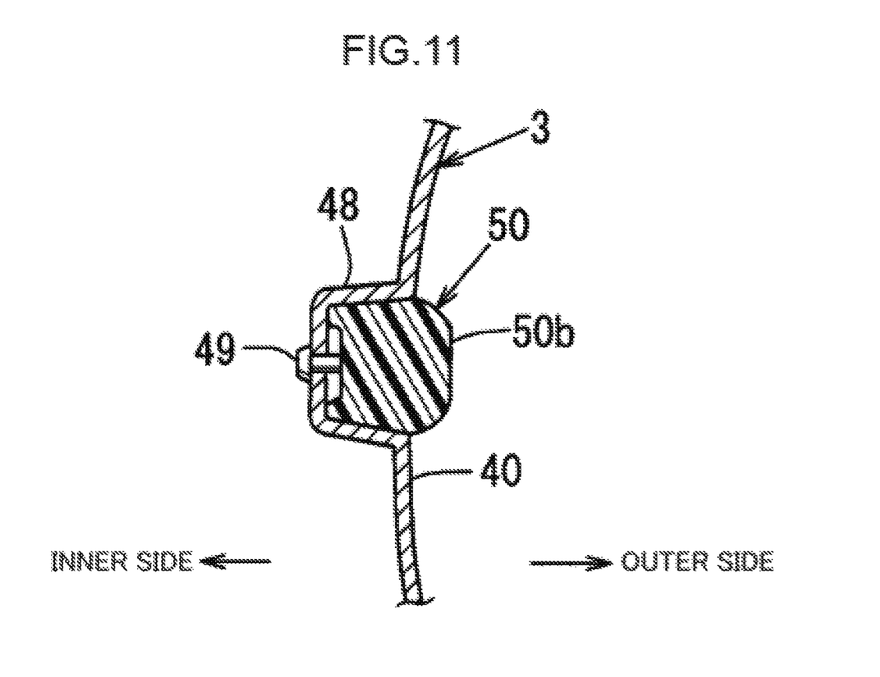
FIG. 11 is a schematic cross-sectional view of the attachment structure of the protruding member 50 to the front fender 3 with a cross section along a XI-XI line of FIG. 8.

FIG. 6 is a schematic cross-sectional view with a cross section along a VI-VI line of FIG. 2, FIG. 7 is a schematic cross-sectional view with a cross section along a VII-VII line of FIG. 2, FIG. 8 is a schematic side view of FIG. 2, FIG. 9 is a schematic cross-sectional view with a cross section along an IX-IX line of FIG. 8, FIG. 10 is a schematic cross-sectional view with a cross section along a X-X line of FIG. 8, and FIG. 11 is a schematic cross-sectional view with a cross section along a XI-XI line of FIG. 8.

As illustrated in FIGS. 1 to 2 and FIGS. 6 to 7, a recessed portion 40 formed in a shape recessed inward in the vehicle width direction to define a smooth curved surface as viewed from above the vehicle is provided on a rear side of the center 70 (the front wheel center) of the front wheel 7 at the front fenders 3. As illustrated in FIG. 9, the recessed portion 40 is in such a recessed shape that the recessed portion 40 is recessed inward in the vehicle width direction to define the smooth curved surface as viewed in a cross section.

As illustrated in FIG. 8, an opening 41 extending in the vehicle front-to-rear direction and penetrating in and out of the front fender 3 in the vehicle width direction is provided at the substantially same height position of the recessed portion 40 as that of the vicinity of an upper end position of the front wheel 7 (note that the front wheel is in a normal state in which the front wheel does not bound or rebound).

The side door 11 (see FIGS. 6 and 7) is provided at a rear portion of the front fender 3. The side door 11 is configured such that a door outer panel 11a and a door inner panel 11b are integrated together by hemming.

As illustrated in FIGS. 1 and 2, the recessed portion 40 further extends to the vehicle rear side with respect to the opening 41. That is, as illustrated in, e.g., FIG. 6, an extending recessed portion 42 is formed such that the door outer panel 11a of the side door 11 is recessed inward in a recessed shape in the vehicle width direction to define a smooth curved surface as viewed from above the vehicle and from the front of the vehicle.

As illustrated in FIG. 1, the opening 41 and the rear opening 23e of the head lamp unit 21 communicate with each other through a side duct 43. A through-hole 43a facing the inside of the engine room 1 is formed at an inner surface of the side duct 43 in the vehicle width direction.

As illustrated in FIG. 6, the recessed portion 40 and the extending recessed portion 42 are each recessed inward in the recessed shape in the vehicle width direction to define the smooth curved surface as viewed not only from above the vehicle but also from the front of the vehicle. Particularly in the recessed portion 40, negative pressure is three-dimensionally generated by turbulence (a).

As illustrated in FIGS. 1 and 2, the recessed portion 40 is provided with the opening 41 penetrating in and out of the front fender 3 in the vehicle width direction. Moreover, the side door 11 is provided with the extending recessed portion 42 where the recessed portion 40 extends further to the vehicle rear side than the opening 41. With this configuration, the three-dimensional negative pressure generated in the recessed portion 40 is effectively utilized in the vehicle 100, and therefore, blowing properties of an airflow such as hot air from the inside of the front fender 3 are improved.

Specifically, the following configuration is employed. Of traveling air having flowed into the ventilation path 27 from the front opening 23f of the head lamp unit 21, a hot airflow having cooled the head lamp 24, the AFS actuator 25, and the controller 26 flows into the side duct 43 from the rear opening 23e, a hot airflow in the engine room 1 flows into the side duct 43 from the through-hole 43a, and the airflow having flowed downward in the side duct 43 is, due to the negative pressure, discharged to the outside of the vehicle from the opening 41 of the front fender 3.

As illustrated in FIGS. 1 to 2 and FIGS. 9 to 11, the recessed portion 40 and the extending recessed portion 42 recessed inward in the vehicle width direction to define the smooth curved surfaces as viewed from the front of the vehicle, particularly the extending recessed portion 42, is formed narrower toward the vehicle rear side. Specifically, it is configured such that the dimension of the extending recessed portion 42 in an upper-to-lower direction decreases toward the vehicle rear side. With this configuration, unnecessary generation of a negative pressure area is reduced in the vehicle 100.

Similarly, as illustrated in FIG. 6, the recessed portion 40 and the extending recessed portion 42 recessed inward in the vehicle width direction to define the smooth curved surfaces as viewed from above the vehicle, particularly the extending recessed portion 42, is formed narrower toward the vehicle rear side. Specifically, it is configured such that the inward recess size of the extending recessed portion 42 in the vehicle width direction decreases toward the vehicle rear side. With this configuration, unnecessary generation of the negative pressure area is suppressed in the vehicle 100.

As illustrated in FIG. 9, an upper inflecting portion 44 inflecting in a shape raised outward in the vehicle width direction is provided above the recessed portion 40 recessed inward in the vehicle width direction to define the smooth curved surface as viewed from the front of the vehicle. That is, the upper inflecting portion 44 is formed such that an upper side of the recessed portion 40 is formed with gradual outward displacement toward an inflection point α in the vehicle width direction and that the front fender 3 above the inflection point α gradually displaces inward in the vehicle width direction.

Moreover, as illustrated in the same figure, a lower inflecting portion 45 inflecting in a shape raised outward in the vehicle width direction is provided below the recessed portion 40 recessed inward in the vehicle width direction to define the smooth curved surface as viewed from the front of the vehicle. That is, the lower inflecting portion 45 is formed such that a lower side of the recessed portion 40 is formed with gradual outward displacement toward an inflection point β in the vehicle width direction and that the front fender 3 below the inflection point β gradually displaces inward in the vehicle width direction.

As illustrated in FIGS. 1 and 2, the inflection points α, β and the upper and lower inflecting portions 44, 45 are also formed continuous to the side door 11 provided with the extending recessed portion 42.

Further, a lower portion 3a of the front fender 3 as a lower portion of the lower inflecting portion 45 is, in the vehicle front-to-rear direction, continuously formed flush with a body side outer panel 46 positioned outside a side sill outer in the vehicle width direction.

That is, the lower inflecting portion 45 inflecting in the shape raised outward in the vehicle width direction is provided below the recessed portion 40 recessed inward in the vehicle width direction as viewed from the front of the vehicle. As illustrated in FIG. 7, a vehicle side flow (b) near a road surface (near the ground) flows, in the vehicle 100, straight from the front to the rear in the side of the vehicle. Thus, generation of an unnecessary negative pressure area in a side portion of the vehicle can be reduced, and an increase in aerodynamic drag can be prevented. Note that an arrow indicated by a virtual line c in FIG. 6 represents a vehicle side flow positioned corresponding to the recessed portion 40.

As illustrated in FIG. 8 and FIGS. 9 to 11, flange portions 41a, 41b each extending inward from a corresponding one of upper and lower opening edges of the opening 41 in the vehicle width direction are integrally formed at a portion of the front fender 3 provided with the opening 41 penetrating in and out of the front fender 3 in the vehicle width direction.

Moreover, as illustrated in FIGS. 10 and 11, laterally-facing U-shaped mounting seats 47, 48 opening on the outer side in the vehicle width direction are each integrally formed at a corresponding one of front and rear portions of the opening 41 of the front fender 3.

Further, a protruding member 50 including the front and rear mounting seats 47, 48 and the opening 41 is provided to extend in the front-to-rear direction of the vehicle 100, and is attached to the mounting seat 48 with a plurality of clips 49 integrated or formed integrally with the protruding member 50.

As illustrated in FIG. 8, the protruding member 50 is formed such that a front piece 50a having a smaller upper-to-lower width than that of the opening 41 and a rear piece 50b corresponding to the opening-side upper-to-lower dimension of the mounting seat 48 are integrated in the front-to-rear direction of the vehicle 100. As illustrated in FIGS. 8 and 10, mesh members 52 are, using a plurality of clips 51, attached between the front piece 50a and the front mounting seat 47, between the front piece 50a and each of the upper and lower flange portions 41a, 41b of the opening 41, and between the front piece 50a and the rear mounting seat 48.

As illustrated in FIG. 9, the front piece 50a of the protruding member 50 positioned corresponding to the opening 41 is formed to protrude to the outside of the recessed portion 40 in the vehicle width direction from the inside of the opening 41 in the vehicle width direction to the outside of the opening 41 in the vehicle width direction. With this configuration, e.g., an airflow of hot air is, in the vehicle 100, guided to the outside of the front fender 3, and can be more effectively discharged.

As illustrated in FIG. 8, a rear end of the rear piece 50*b* of the protruding member 50 extends, in the present embodiment, to a front end portion of the side door 11, and therefore, a cutout portion 53 for avoiding contact with the protruding member 50 upon opening/closing of the door is formed at the side door 11.

As described above, the front structure of the vehicle 100 of the present embodiment is the front structure of the vehicle configured such that the vehicle front lamp (the head lamp unit 21) is provided at each end portion of the front portion of the vehicle 100 in the vehicle width direction. The cover member 22 is disposed above at least the headlight (the head lamp 24) of the components of the vehicle front lamp (the head lamp unit 21), the ventilation path 27 allowing passage of traveling wind from the vehicle front side is formed outward or inward of the headlight (the head lamp 24) in the vehicle width direction (inward of the headlight in the vehicle width direction in the present embodiment) below the cover member 22, and the lighting accessories (the controller 26, the AFS actuator 25) are arranged above the rear portion of the headlight (the head lamp 24) (see FIG. 1 and FIGS. 3 to 4).

According to such a configuration, the lighting accessories (the controller 26, the AFS actuator 25) are arranged above the rear portion of the headlight (the head lamp 24), and therefore, the front-to-rear length of the vehicle front lamp (the head lamp unit 21) can be shortened. Moreover, the ventilation path 27 allowing passage of traveling wind is formed outward or inward of the headlight (the head lamp 24) in the vehicle width direction below the cover member 22, and therefore, the headlight (the head lamp 24) and the lighting accessories (the controller 26, the AFS actuator 25) can be cooled with the traveling wind passing through the ventilation path 27.

That is, both of shortening of the front-to-rear length of the vehicle front lamp (the head lamp unit 21) and ensuring of the cooling performance are realized, and as a result, improvement of the degree of freedom in the vehicle layout and shortening of the front overhang are realized.

In the present embodiment, it is configured such that the air-cooling unit (the heat dissipation fins 26*a*, 25*a*, 24*d*) is provided at at least one of the lighting accessories (the controller 26, the AFS actuator 25) and the headlight (the head lamp 24) and is at least partially disposed in the ventilation path 27 (see FIGS. 3 and 4).

According to this configuration, heat can be dissipated from at least a portion of the air-cooling unit (the heat dissipation fins 26*a*, 25*a*, 24*d*) disposed in the ventilation path 27, and therefore, e.g., the temperatures of the light source (the LEDs 24*a*) of the headlight (the head lamp 24) and the lighting accessories (the controller 26, the AFS actuator 25) can be more effectively decreased by air cooling.

In the present embodiment, the light emitter (the LEDs 32) is disposed at the outer periphery of the cover member 22, and the accessories (the printed circuit board 33, the housing 34) of the light emitter (the LEDs 32) are arranged below the cover member 22 (see FIGS. 3 and 4).

According to this configuration, the accessories (the printed circuit board 33, the housing 34) of the light emitter (the LEDs 32) can be compactly arranged below the cover member 22, and the design can be improved while the layout properties are ensured.

In the present embodiment, the headlight (the head lamp 24), the cover member 22, the lighting accessories (the controller 26, the AFS actuator), and the accessories (the printed circuit board 33, the housing 34) of the light emitter (the LEDs 32) are integrally assembled together (see FIGS. 3 and 4).

According to this configuration, the headlight (the head lamp 24), the cover member 22, the lighting accessories (the controller 26, the AFS actuator 25), and the accessories (the printed circuit board 33, the housing 34) of the light emitter (the LEDs 32) can be formed into an integrated unit. Thus, both of the mountability of the vehicle front lamp (the head lamp unit 21) on the vehicle and the accuracy of assembly among the components can be ensured.

Note that in the case of separately assembling the headlight and the cover member, the mountability is lowered, and the accuracy of assembly among the components is insufficient. For this reason, the configuration is employed in the present embodiment.

In a correspondence between the configuration of the present disclosure and the embodiment, the vehicle front lamp of the present disclosure corresponds to the head lamp unit 21 of the embodiment. Similarly, the headlight corresponds to the head lamp 24, the lighting accessories correspond to the AFS actuator 25 and the controller 26, the air-cooling unit corresponds to any one of the heat dissipation fins 24*d*, 25*a*, 26*a*, the light emitter corresponds to the LEDs 32, and the accessories of the light emitter correspond to the printed circuit board 33 and the housing 34. Note that the technical scope of the present disclosure is not limited only to the configuration of the embodiment.

[Each Aspect of the Present Disclosure]

A front structure of a vehicle of an aspect of the present disclosure is configured such that a vehicle front lamp is provided at each end portion of a vehicle front portion in a vehicle width direction. The vehicle front lamp includes a headlight, a cover member, and a lighting accessory.

The cover member is disposed above the headlight.

The lighting accessory is disposed above a rear portion of the headlight and below the cover member.

In the front structure of the vehicle of the present aspect, the vehicle front lamp is provided with a ventilation path formed outward or inward of the headlight in the vehicle width direction below the cover member and allowing traveling wind from a vehicle front side to pass toward a vehicle rear side.

In the front structure of the vehicle of the present aspect, the lighting accessory is disposed above the rear portion of the headlight (a head lamp), and therefore, the front-to-rear length of the vehicle front lamp (a head lamp unit) can be shortened.

Moreover, in the front structure of the vehicle of the present aspect, the ventilation path allowing passage of the traveling wind is formed outward or inward of the headlight in the vehicle width direction below the cover member, and therefore, the headlight and the lighting accessory can be cooled with the traveling wind passing through the ventilation path.

Thus, in the front structure of the vehicle of the present aspect, both of shortening of the front-to-rear length of the vehicle front lamp and ensuring of cooling performance are realized, and as a result, improvement of the degree of freedom in a vehicle layout and shortening of a front overhang are realized.

Note that a controller and an active front lighting system (AFS) actuator are applicable as the lighting accessory.

In the configuration described above, a front structure of a vehicle of another aspect of the present disclosure is configured such that an air-cooling unit is disposed on an inner surface or outer surface of the lighting accessory and the headlight, thereof is provided at at least one of the lighting accessory and the headlight and is at least partially disposed in the ventilation path.

In the front structure of the vehicle of the present aspect, the air-cooling unit is at least partially disposed in the ventilation path, and therefore, heat can be dissipated from such a portion. Thus, in the front structure of the vehicle of the present aspect, e.g., the temperatures of a light source of the headlight and the lighting accessory can be more effectively decreased by air cooling.

Note that a heat dissipation fin is applicable as the air-cooling unit.

In the configuration described above, a front structure of a vehicle of still another aspect of the present disclosure is configured such that the vehicle front lamp further includes a light emitter and an accessory of the light emitter.

The light emitter is disposed at the outer periphery of the cover member.

The accessory of the light emitter is disposed below the cover member.

In the front structure of the vehicle of the present aspect, the accessory of the light emitter is disposed below the cover member. Thus, the accessory of the light emitter can be compactly disposed, and design can be improved while layout properties are ensured.

Note that a light emitting diode (LED) is applicable as the light emitter. Moreover, a printed circuit board and a housing covering the board are applicable as the accessory of the light emitter.

In the configuration described above, a front structure of a vehicle of still another aspect of the present disclosure is configured such that the headlight, the cover member, the lighting accessory, and the accessory of the light emitter are integrally assembled together.

In the front structure of the vehicle of the present aspect, the headlight, the cover member, the lighting accessory, and the accessory of the light emitter can be formed into an integrated unit. Thus, both of mountability of the vehicle front lamp (the head lamp unit) on the vehicle and the accuracy of assembly among the components can be ensured.

Note that in the case of separately assembling the headlight and the cover member, the mountability is lowered, and the accuracy of assembly among the components is insufficient. In the configuration described above, a front structure of a vehicle of another aspect of the present disclosure is configured such that the cover member is provided to extend to posterosuperior in the vehicle front-to-rear direction, between an opening of the ventilation path and the light emitter, a controller as the lighting accessory, is configured to control the head lamp, upper surface and front surface covered with the cover member, that is position at an anterior position of the light emitter.

The invention claimed is:

1. A front structure of a vehicle having a vehicle front lamp provided at each end portion of a vehicle front portion in a vehicle width direction, wherein the vehicle front lamp includes:
   a headlight,
   a cover member disposed above the headlight,
   a head lamp unit case located under the cover member to accommodate the headlight in an internal space defined between the cover member and the head lamp unit, and
   a lighting accessory disposed above a rear portion of the headlight, below the cover member and in front of a rear wall of the head lamp unit case in the internal space, and wherein
   the cover member has a front end disposed above the headlight and below a rear end of the cover member,
   the vehicle front lamp is provided with a ventilation path that is formed outward or inward of the headlight in the vehicle width direction below the cover member and that allows traveling wind from a vehicle front side to pass toward a vehicle rear side, and
   at least one of the headlight and the lighting accessary is provided with a heat dissipation fin serving as an air-cooling unit, the heat dissipation fin extending in a vehicle front-to-rear direction in such a manner as to face the ventilation path.

2. The front structure of the vehicle according to claim 1, wherein
   the vehicle front lamp further includes a light emitter disposed at an outer periphery of the cover member and an accessory of the light emitter, and
   the accessory of the light emitter is disposed below the cover member.

3. The front structure of the vehicle according to claim 2, wherein
   the headlight, the cover member, the lighting accessory, and the accessory of the light emitter are integrally assembled together.

4. The front structure of the vehicle according to claim 2, wherein
   the cover member is provided to extend to posterosuperior in the vehicle front-to-rear direction, between an opening of the ventilation path and the light emitter,
   a controller as the lighting accessory, is configured to control the head lamp, upper surface and front surface covered with the cover member, that is position at an anterior position of the light emitter.

5. The front structure of the vehicle according to claim 3, wherein
   the cover member is provided to extend to posterosuperior in the vehicle front-to-rear direction, between an opening of the ventilation path and the light emitter,
   a controller as the lighting accessory, is configured to control the head lamp, upper surface and front surface covered with the cover member, that is position at an anterior position of the light emitter.

6. The front structure of the vehicle according to claim 1, wherein
   the rear wall of the head lamp unit case is formed with a rear opening including an arrangement position of the headlight as viewed from a front of the vehicle, and
   the vehicle front lamp has a front end formed with a front opening surrounded by a front end of the head lamp unit case and the front end of the cover member, the front opening being longer than the rear opening in the vehicle width direction.

* * * * *